United States Patent [19]

Posar et al.

[11] Patent Number: 5,380,413
[45] Date of Patent: Jan. 10, 1995

[54] PROCESS FOR THE MANUFACTURE OF A BIPOLAR MEMBRANE AND PROCESS FOR THE MANUFACTURE OF AN AQUEOUS ALKALI METAL HYDROXIDE SOLUTION

[75] Inventors: Francesco Posar, Rosignano-Solvay; Mauro Ricciardi, Castelnuovo Della Misericordia, both of Italy

[73] Assignee: Solvay (Société Anonyme), Brussels, Belgium

[21] Appl. No.: 220,488

[22] Filed: Mar. 31, 1994

[30] Foreign Application Priority Data

Apr. 8, 1993 [BE] Belgium .............................. 09300351

[51] Int. Cl.⁶ .............................................. B01D 61/44
[52] U.S. Cl. .............................. 204/182.4; 204/182.5; 204/295; 204/296; 204/301; 521/27
[58] Field of Search ............ 204/295, 296, 301, 182.4, 204/182.5; 521/27

[56] References Cited

U.S. PATENT DOCUMENTS

| | | | |
|---|---|---|---|
| 2,829,095 | 4/1958 | Oda et al. | 204/98 |
| 4,238,305 | 12/1980 | Gancy et al. | 204/182.4 |
| 5,227,040 | 7/1993 | Simons | 204/295 |

FOREIGN PATENT DOCUMENTS

| | | |
|---|---|---|
| 2122543 | 1/1984 | United Kingdom . |
| 89/01059 | 2/1989 | WIPO . |

OTHER PUBLICATIONS

R. Simmons: "A Novel Method for Preparing Bipolar Membranes". Electrochimica Acta, vol. 31, No. 9, pp. 1175 and 1176. Sep. (1986) no month given.

*Primary Examiner*—John Niebling
*Assistant Examiner*—Arun S. Phasge
*Attorney, Agent, or Firm*—Spencer, Frank & Schneider

[57] ABSTRACT

Process for the manufacture of a bipolar membrane, according to which a cationic membrane is treated with a compound of a polyvalent metal and with an aqueous alkali metal hydroxide solution comprising lithium hydroxide and is then joined side by side to an anionic membrane. The bipolar membrane finds an application in the manufacture of aqueous sodium hydroxide solutions by electrodialysis.

No figure.

10 Claims, No Drawings

PROCESS FOR THE MANUFACTURE OF A BIPOLAR MEMBRANE AND PROCESS FOR THE MANUFACTURE OF AN AQUEOUS ALKALI METAL HYDROXIDE SOLUTION

The present invention relates to a process for the manufacture of bipolar membranes.

Bipolar membranes are constituent components of electrodialysis cells. The latter are well-known in technology where they are especially used for the manufacture of acids and bases starting from their salts.

In processes which are generally used for manufacturing bipolar membranes, a cationic membrane and an anionic membrane, which have been subjected beforehand to a preconditioning, are joined side by side. To this end, in International Application WO 89/01059 (Unisearch Limited), a description is given of a process for the manufacture of a bipolar membrane, according to which a cationic membrane and an anionic membrane are treated separately with an alkaline solution of a salt of a metal other than sodium or potassium, the cationic membrane and the anionic membrane are then joined side by side, and the assembly thus obtained is then treated with an aqueous alkali metal solution. In a modified embodiment of this known process, the cationic membrane and the anionic membrane are treated with the aqueous alkali metal solution before being joined to each other side by side. In these known processes, the alkali metal solution used is a sodium hydroxide solution and incorporation of the metal salt therein is recommended.

The bipolar membranes obtained by means of the known processes described above are generally characterized by good mechanical strength and moderate electrical resistance.

The objective of the invention is to provide more simply and more economically bipolar membranes with performances at least comparable with those of membranes obtained by means of the known processes described above.

Consequently, the invention relates to a process for the manufacture of a bipolar membrane, according to which a cationic membrane is treated with a compound of a polyvalent metal and with an aqueous alkali metal hydroxide solution and is then joined side by side to an anionic membrane, the process being characterized in that the alkali metal hydroxide comprises lithium hydroxide.

Cationic membrane is understood to denote a thin, non-porous sheet which is selectively permeable to cations and impermeable to anions. The cationic membranes which can be used in the process according to the invention must be made of a material which is inert with respect to aqueous acidic or basic solutions. Cationic membranes which can be used in the process according to the invention are, for example, sheets made of fluorinated polymer containing functional groups derived from sulphonic acids, carboxylic acids or phosphonic acids or mixtures of such functional groups, these groups acting as permanent cationic sites of the membrane. Membranes which are particularly suited to this application of the cell according to the invention are those known under the name Raipore (Pall Rai).

By definition, an anionic membrane is a thin, non-porous sheet which is selectively permeable to anions and impermeable to cations. Anionic membranes which can be used in the process according to the invention are sheets made of a polymeric material which is inert with respect to aqueous acidic or basic solutions and which comprises quaternary ammonium groups acting as permanent anionic sites.

In practice, the cationic membranes are not absolutely impermeable to anions and the anionic membranes are not absolutely impermeable to cations. By definition, the current efficiency of a cationic membrane is the molar fraction of the cation which effectively passes through the membrane under the action of one faraday. Similarly, the current efficiency of an anionic membrane is the molar fraction of the anion which effectively passes through the membrane under the action of one faraday.

Bipolar membranes are membranes which exhibit, on one face, the properties of a cationic membrane and, on the other face, the properties of an anionic membrane.

In the process according to the invention, the polyvalent metal is advantageously selected from transition elements. Chromium, iron, nickel, ruthenium, zirconium and rhodium are preferred. Chromium is very particularly suitable.

The polyvalent metal compound is preferably an inorganic salt. The latter can advantageously be selected from chlorides, nitrates, phosphates and sulphates. Chlorides are preferred and, among the latter, chromic chloride is especially recommended. Hydrated chromic chloride is advantageously used, chromic chloride hexahydrate being preferred.

Treatment of the cationic membrane with the polyvalent metal compound has the function of substituting at least a part of the mobile cations or counter ions of the cationic membrane with ions of the polyvalent metal. In principle, the number of polyvalent metal ions present in the cationic membrane on completion of the treatment is not critical. However, the aim is generally to incorporate, in the cationic membrane, an amount of cations of the polyvalent metal at least equal to 0.001 (preferably 0.01) mol per $m^2$ of the face of the cationic membrane intended to come into contact with the anionic membrane, the values from 0.02 to 0.03 mol per $m^2$ generally being well-suited.

Treatment of the cationic membrane with the polyvalent metal compound can advantageously be carried out by bringing the cationic membrane into contact with an aqueous solution of the polyvalent metal compound, for example by immersing the cationic membrane in an aqueous bath of the said compound. In this embodiment of the invention, the concentration of the aqueous solution is not critical but concentrated solutions are, however, preferred. In practice, the use is recommended of aqueous solutions in which the concentration of polyvalent metal compound is at least equal to 0.05 (preferably to 0.1) mol/l. The maximum allowable concentration in the aqueous solution of the polyvalent metal compound is that which corresponds to saturation and it consequently depends on various parameters such as the nature of the polyvalent metal compound, the temperature of the solution and the value of the pH of the latter. It is preferable to use solutions at a temperature in the region of room temperature, for example from 15° to 35° C.

In the process according to the invention, the polyvalent metal compound can be used in the form of an acidic solution. In this embodiment of the invention, it is possible especially to select an acidic solution in which the pH is less than 3, for example between 0.05 and 1, such as an aqueous hydrochloric acid solution. This embodiment of the invention makes it possible to use concentrated aqueous solutions of the polyvalent metal compound which contain, for example, from 0.8 to 1.5 mol per liter of the said compound, in the case where the latter is chromic chloride hexahydrate.

However, it is preferable, according to another embodiment of the invention, that the polyvalent metal compound is used in the form of a basic solution, the pH of which is advantageously at least equal to 10, preferably to 12. To this end, it is possible advantageously to use an aqueous alkali metal hydroxide solution, the alkali metal being, for example, sodium, potassium or lithium. It is preferable to select an aqueous lithium hydroxide solution. Aqueous solutions comprising at least 1 mol of lithium hydroxide are especially recommended. In practice, it is advantageous to use an aqueous solution which is as concentrated as possible in lithium hydroxide.

Treatment of the membrane with the polyvalent metal compound can be carried out equally well at room temperature or at high temperature, it being necessary, however, for the latter to remain below the thermal degradation temperature of a cationic membrane. The duration of the treatment must be sufficient to incorporate the desired number of cations of the polyvalent metal in the cationic membrane. It will consequently depend on many parameters, such as the polyvalent metal compound selected, the concentration of the solution and its temperature.

According to the invention, the cationic membrane is also treated with an aqueous alkali metal hydroxide solution comprising lithium hydroxide.

Aqueous alkali metal hydroxide solution comprising lithium hydroxide is understood to denote an aqueous metal hydroxide solution which contains a substantial amount of lithium hydroxide. In addition to lithium hydroxide, the aqueous alkali metal solution can, for example, comprise sodium hydroxide or potassium hydroxide. In practice, aqueous alkali metal hydroxide solutions which can be used in the process according to the invention are those in which the content, in moles, of lithium hydroxide is at least 50 percent of alkali metal hydroxide. Aqueous alkali metal hydroxide solutions which are especially advantageous are those in which the content, in moles, of lithium hydroxide is at least 80 (preferably at least 90) percent of alkali metal hydroxide, solutions in which the alkali metal hydroxide consists entirely of lithium hydroxide being preferred.

In the process according to the invention, treatment with the aqueous alkali metal hydroxide solution can be carried out at the same time as treatment with the polyvalent metal compound by using, to this end, an aqueous solution of the polyvalent metal compound and of lithium hydroxide.

In a preferred embodiment of the process according to the invention, treatment with the aqueous alkali metal hydroxide solution is carried out after treatment with the polyvalent metal compound. In this preferred embodiment, it is preferable that the aqueous alkali metal hydroxide solution does not contain a polyvalent metal compound. According to an advantageous implementational variant of this preferred embodiment of the invention, the cationic membrane is first treated with an aqueous lithium hydroxide solution comprising the polyvalent compound and then with the aqueous alkali metal hydroxide solution defined above.

In the preferred embodiment which has just been described and its implementational variant, treatment of the cationic membrane with the aqueous alkali metal hydroxide solution can, for example, be carried out by spraying the solution onto the face of the cationic membrane intended to come into contact with the anionic membrane or by impregnating the said face with the solution, for example by means of a brush. A preferred means consists in immersing the membrane in a bath of the solution.

Although not wishing to be bound by a theoretical explanation, the inventors think that treatment with the aqueous alkali metal hydroxide solution has the function of converting the cations of the polyvalent metal which are present in the cationic membrane into metal hydroxide. It is consequently essential, in accordance with the invention, to use a theoretical amount of the alkali metal hydroxide solution at least sufficient to convert a substantial fraction of the cations of the polyvalent metal of the cationic membrane into metal hydroxide, the said fraction generally being at least equal to 50, preferably to 90% of the polyvalent cations present in the bipolar membrane. The optimum amount to be used, as regards the aqueous alkali metal hydroxide solution, will consequently depend on various parameters such as the amount of cations of the polyvalent metal in the cationic membrane, the nature of the polyvalent metal, especially its valency, the concentration of the solution and its temperature and it can be determined in each specific case by routine laboratory work. In practice, good results are generally obtained with alkali metal hydroxide solutions containing at least 0.5 (preferably 0.8) mol of alkali metal hydroxide per liter, the maximum allowable content corresponding to saturation. Contents of 0.8 to 1.2 mol of alkali metal hydroxide per liter are generally well-suited. Although solutions at room temperature may be suitable, it is preferable to use hot solutions, for example at a temperature from 50° to 90° C.

As a variant, the process according to the invention can optionally comprise an optional washing of the cationic membrane with demineralized water, between treatment with the polyvalent metal compound and treatment with the sodium hydroxide solution, as well as after treatment with the aqueous alkali metal hydroxide solution. Washing is generally carried out at room temperature, although lower or higher temperatures can also be suitable.

Any appropriate means can be used to join the cationic membrane and the anionic membrane side by side. A preferred means, according to a specific embodiment of the invention, consists in applying and pressing the two membranes against each other, in the wet state, while avoiding formation of air pockets between the two membranes. To this end, in this embodiment of the invention, the cationic membrane and the anionic membrane are treated separately with demineralized water before being applied against each other. It is possible to carry out this operation at room temperature or high temperature, provided that the latter remains below the thermal degradation temperature of the anionic membrane or of the cationic membrane.

The bipolar membrane recovered on completion of the process according to the invention must preferably be stored in the wet state, before its use in an electrodialysis cell.

In the use of the process according to the invention, the anionic membrane can be subjected to a treatment similar to that of the cationic membrane before being joined side by side to the cationic membrane. To this end, it can be treated successively with the polyvalent metal compound and with the aqueous alkali metal hydroxide solution, under the conditions stated above in the case of the cationic membrane. In this embodiment of the process according to the invention, the polyvalent metal compound used for treatment of the anionic membrane can be identical to or different from the polyvalent metal compound used for treatment of the cationic membrane. The same polyvalent metal compound is preferably used for treatment of the cationic membrane and for treatment of the anionic membrane. The alkali metal hydroxide solution used for treatment of the anionic membrane can be identical to that used for treatment of the cationic membrane. As a variant, it can be substantially free from lithium hydroxide.

In another embodiment of the process, which is preferred, only the cationic membrane is subjected to treatment with the polyvalent metal compound and with the aqueous alkali metal hydroxide solution, the anionic membrane being subjected, before being applied to the cationic membrane, to a treatment consisting essentially of a washing with demineralized water. This embodiment of the process according to the invention has the advantage of a greater simplification, without harming the performance of the bipolar membrane.

The bipolar membrane obtained by means of the process according to the invention as described above is well-suited to the electrochemical decomposition of water and it can consequently be used in electrodialysis techniques using aqueous solutions. It thus finds a use in the manufacture of acids and bases starting from their salts. The bipolar membrane obtained by means of the process according to the invention finds a particularly advantageous application in the manufacture of aqueous alkali metal hydroxide (especially sodium hydroxide) solutions by electrodialysis of aqueous solutions of alkali metal salts, such as alkali metal chloride, carbonate, phosphate, sulphate or acetate.

The invention consequently also relates to a process for the manufacture of an aqueous alkali metal hydroxide solution by electrodialysis of an aqueous solution of an alkali metal salt, according to which electrodialysis is carried out in the presence of a bipolar membrane obtained by means of the process in accordance with the invention defined above.

The invention applies especially to the manufacture of aqueous sodium hydroxide solutions by electrodialysis of aqueous sodium chloride solutions, for example by means of the technique described in U.S. Pat. No. 4,238,305.

The examples which follow are used to illustrate the invention.

In the examples, Raipore (Pall Rai) anionic membranes and cationic membranes were used. Raipore cationic membranes are membranes made of fluorinated polymer carrying functional groups derived from carboxylic acid and Raipore anionic membranes are membranes made of polymer carrying functional groups derived from quaternary ammonium.

EXAMPLE 1 (in accordance with the invention)

In this example, a Raipore R-4010 cationic membrane and a Raipore R-1030 anionic membrane were used.

The cationic membrane was subjected to a treatment comprising the following successive stages:
 an immersion in a molar aqueous hydrochloric acid solution at room temperature for approximately 15 minutes;
 an immersion in an aqueous acidic chromic trichloride hexahydrate solution (containing 300 g of chromic trichloride hexahydrate and 50 g of hydrochloric acid per liter) at room temperature for 24 hours;
 a washing by immersion in a bath of demineralized water at room temperature for 15 minutes;
 an immersion in a molar aqueous lithium hydroxide solution at 70° C. for 15 minutes;
 a washing by immersion in a bath of demineralized water at room temperature for a few seconds.

Moreover, the anionic membrane was subjected to an immersion in a bath of demineralized water at room temperature for one hour.

Upon completion of the respective treatments of the cationic membrane and of the anionic membrane, they were applied against each other in the wet state and at low pressure, so as to form a bipolar membrane.

In order to evaluate the performance of the bipolar membrane thus obtained, use was made of an electrochemical measuring cell divided into four successive compartments by the bipolar membrane to be tested, arranged vertically, and two Nafion trademark (Dupont) cationic membranes, arranged vertically, on either side of the bipolar membrane. A nickel cathode and anode were arranged respectively in the two end compartments of the cell. The bipolar membrane was positioned in the cell so that its anionic face was directed towards the anode. A 0.10 weight % sodium hydroxide solution was made to move in the two end compartments. A 1M aqueous sodium hydroxide solution was made to move in the median compartment comprising the anionic face of the bipolar membrane and a 1M hydrochloric acid solution was made to move in the median compartment comprising the cationic face of the bipolar membrane. The compartments of the cell were maintained at room temperature.

The anode and the cathode of the cell were connected to the terminals of a current source, adjusted so as to generate, in the cell, a current of 10 kA/m$^2$ of surface area of the bipolar membrane. The potential difference between the two faces of the bipolar membrane was measured by means of Luggin probes. This potential difference stabilized between 0.95 and 1.05 V.

EXAMPLE 2 (in accordance with the invention)

The test of Example 1 was repeated, using a Raipore R-4010 cationic membrane and a Raipore R-4030 anionic membrane.

The potential difference between the two faces of the bipolar membrane was measured, in the same way as and under the conditions described in Example 1. The potential difference stabilized between 0.93 and 0.99 V.

EXAMPLE 3 (in accordance with the invention)

In this example, a Raipore R-4010 cationic membrane and a Raipore R-4030 anionic membrane were also used. The cationic membrane and the anionic membrane were subjected to the treatment which, in Example 2, was applied to the cationic membrane.

The potential difference between the two faces of the bipolar membrane was measured, in the same way as and under the conditions described in Example 1. The potential difference stabilized between 1.00 and 1.06 V.

EXAMPLE 4 (reference)

All the conditions of the test of Example 3 were repeated, except as regards the aqueous lithium hydroxide solution, which was replaced by an aqueous sodium hydroxide solution. The potential difference between the two faces of the bipolar membrane stabilized at a mean value of 1.81 V.

Comparison of Examples 3 and 4 reveals the advantage introduced by the invention.

EXAMPLE 5 (in accordance with the invention)

All the conditions of the test of Example 2 were repeated, except that immersion of the cationic membrane in the molar aqueous hydrocholoric acid solution was not carried out. The potential difference between the two faces of the bipolar membrane stabilized at a mean value of 0.97 V.

EXAMPLE 6 (in accordance with the invention)

A Raipore R-4010 cationic membrane and a Raipore R-4030 anionic membrane were used, as in Examples 2 to 5.

The cationic membrane was subjected to a treatment comprising the following successive stages:

an immersion in a basic aqueous chromic trichloride hexahydrate solution (containing 50 g of chromic trichloride hexahydrate and 2 mol of lithium hydroxide per liter) at room temperature for 24 hours;
a washing by immersion in a bath of demineralized water at room temperature for 15 minutes;
an immersion in a molar aqueous lithium hydroxide solution at 70° C. for 15 minutes;
a washing by immersion in a bath of demineralized water at room temperature for a few seconds.

Moreover, the anionic membrane was subjected to an immersion in a bath of demineralized water at room temperature.

Upon completion of the respective treatments of the cationic membrane and of the anionic membrane, they were applied against each other in the wet state and at low pressure, so as to form a bipolar membrane.

The potential difference between the two faces of the bipolar membrane was measured, in the way described in Example 1. The potential difference became established at a mean value of 0.85 V.

EXAMPLE 7 (reference)

The test of Example 6 was repeated, the following differences being introduced therein:

an aqueous solution containing 50 g of chromic trichloride hexahydrate and 2 mol of sodium hydroxide was used for the basic chromic trichloride solution;
the molar lithium hydroxide solution was replaced by a molar sodium hydroxide solution.

The potential difference between the two faces of the bipolar membrane stabilized at a mean value of 1.50 V.

EXAMPLE 8 (reference)

In this example, the cationic membrane and the anionic membrane were subjected to the treatment which, in Example 7, was applied to the cationic membrane. The potential difference between the two faces of the bipolar membrane became established at a mean value of 0.90 V.

Comparison of the result of Example 6 (in accordance with the invention) with those of Examples 7 and 8 reveals the improvement introduced by the invention.

We claim:

1. Process for the manufacture of a bipolar membrane, according to which a cationic membrane is treated with a compound of a polyvalent metal and with an aqueous alkali metal hydroxide solution which comprises lithium hydroxide and is then joined side by side to an anionic membrane.

2. Process according to claim 1, which comprises treating the cationic membrane first with the polyvalent metal compound and then with the aqueous alkali metal hydroxide solution, the said solution being substantially free of polyvalent metal compound.

3. Process according to claim 1, wherein the alkali metal hydroxide comprises at least 90 mol % of lithium hydroxide.

4. Process according to claim 1, wherein the polyvalent metal comprises chromium.

5. Process according to claim 1, which comprises bringing the cationic membrane into contact with an aqueous solution of the said polyvalent metal compound.

6. Process according to claim 5, wherein the solution of the polyvalent metal compound is a basic solution.

7. Process according to claim 6, wherein the basic solution is an aqueous alkali metal hydroxide solution having a pH value at least equal to 12.

8. Process according to claim 6, wherein that the aqueous solution of the polyvalent metal compound comprises at least 0.1 mol per liter of the said compound.

9. Process according to claim 1, which comprises before joining the cationic membrane and the anionic membrane side by side, subjecting the anionic membrane to a treatment which consists essentially of a washing with demineralized water.

10. Process for the manufacture of an aqueous alkali metal hydroxide solution by electrodialysis of an aqueous alkali metal salt solution in the presence of a bipolar membrane obtained by means of a process in accordance with claim 1.

* * * * *